United States Patent [19]

Williams et al.

[11] 4,046,996
[45] Sept. 6, 1977

[54] ELECTRONIC MINNOW COUNTER

[76] Inventors: Larry Thomas Williams, 603 Maple Ave.; William Jerry Williams, 921 Kentucky Parkway, both of Owensboro, Ky. 42301

[21] Appl. No.: 742,915

[22] Filed: Nov. 17, 1976

[51] Int. Cl.² .................. B65G 51/36; G06M 3/02
[52] U.S. Cl. ............................. 235/92 PK; 119/3; 43/56; 235/92 R; 235/92 V
[58] Field of Search ......... 235/92 PK, 92 PE, 92 TC, 235/92 V, 98 R, 98 C; 119/3; 43/56, 100, 55

[56] References Cited

U.S. PATENT DOCUMENTS

| | | | |
|---|---|---|---|
| 2,632,588 | 3/1953 | Hoar | 235/92 PK |
| 2,791,862 | 5/1957 | Shook | 119/3 |
| 3,040,980 | 6/1962 | Mann et al. | 235/92 PK |

Primary Examiner—Joseph M. Thesz
Attorney, Agent, or Firm—Cushman, Darby & Cushman

[57] ABSTRACT

The salesperson sets a predetermining counter on the amount required. The minnows are then placed in the separating tank where they are moved through two funnels at each end of the tank via water force on and through a sensing area where their presence is registered and thus counted.

Movement of the minnows from the separating tank is effected by a combination of whirlpool current and natural habitat effect draw the minnows through clear flexible plastic tubing. The fluid current now confined to one solid stream moves the minnows through the sensor area on and to the holding tank. The minnows are caught in a wire mesh strainer basket in the holding tank, which allows the water to continue to circulate through the drain pipe from the holding tank to pump and reservoir tank. The water is then recycled through the pump back to the separator tank.

When the counter reaches zero, normally open contacts close, causing the solenoid valve to shut off the flow of water and minnows, also de-energizing the pump. The counted minnows caught in the strainer basket are ready for dumping into the customer's minnow container.

4 Claims, 1 Drawing Figure

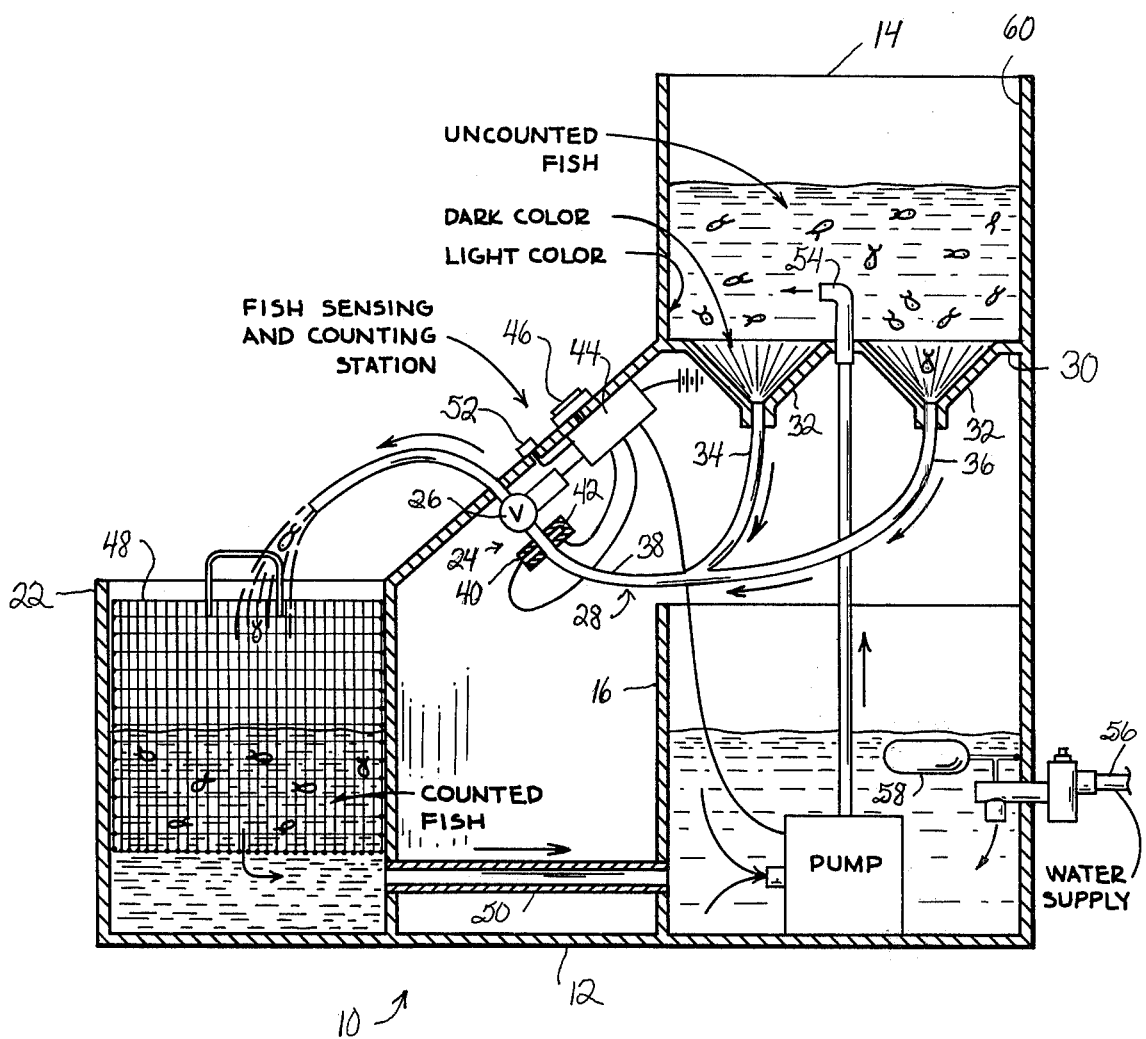

ELECTRONIC MINNOW COUNTER

BACKGROUND OF THE INVENTION

The U.S. Pat. No. of Mann, et al., 3,040,980, June 26, 1962, shows an electric eye-type minnow counting device. Of interest should be the use of a funnel-like member 10 and features of the device based on some natural instincts of minnows (note FIG. 3 and column 5, lines 49-62).

The U.S. Pat. Nos. of Klapes, 3,395,269, July 30, 1968, and Potter, 2,523,517, Sept. 26, 1950, show electric eye counters of small objects that employ automatic cutoff means.

The U.S. Pat. Nos. of Ross, et al., 3,372,784 and Shook, 2,279,862, May 14, 1957, show minnow dispensers that automatically cut off the output of minnows after a predetermined count.

The U.S. Pat. No. of Englesson, 3,273,276, Sept. 20, 1966, shows a fish catching device including pump 4, funnel-shaped trawl 1 and suction line 3. Of interest should be the arrangement of the discharge tube 8 so that the flow of fish may be observed (see column 2, lines 53-65).

The following U.S. patents are selected as examples of ones disclosing photo-electric counting devices:
U.S. Pat. No. 3,760,166
U.S. Pat. No. 3,412,254
U.S. Pat. No. 2,470,926
U.S. Pat. No. 2,333,791

The following U.S. patents show live minnow or bait dispensers that may be of further interest:
U.S. Pat. No. 3,212,210
U.S. Pat. No. 3,105,320
U.S. Pat. No. 3,048,937
U.S. Pat. No. 2,860,444

None of the above-mentioned patents suggests making use of a minnow's light/darkness sense to aid in creating a flow of minnows through a counting device or the like.

SUMMARY OF THE INVENTION

The salesperson sets a predetermining counter on the amount required. The minnows are then placed in the separating tank where they are moved through two funnels at each end of the tank via water force on and through a sensing area where their presence is registered and thus counted.

Movement of the minnows from the separating tank is effected by a combination of whirlpool current and natural habitat effect draw the minnows through clear flexible plastic tubing. The fluid current now confined to one solid stream moves the minnows through the sensor area on and to the holding tank. The minnows are caught in a wire mesh strainer basket in the holding tank, which allows the water to continue to circulate through the drain pipe from the holding tank to pump and reservoir tank. The water is then recycled through the pump back to the separator tank.

When the counter reaches zero, normally open contacts close, causing the solenoid value to shut off the flow of water and minnows, also de-energizing the pump. The counted minnows caught in the strainer basket are ready for dumping into the customer's minnow container.

Of course, the device could be easily automated further to permit coin operation.

In developing the present invention, the inventors have taken into consideration many things, such as speed, separation, accuracy, self-aeration, provision of a closed water system and self-replenishment, and the most important feature: handling of the minnows in such a way as not to harm them. We have found that minnows are easily shocked to death by a temperature change of only 10° F. Also, utilization of the light-to-dark area is most important. We have found that a minnow will naturally swim himself to death in a light area where there is no dark area of safety. The dark areas afford two benefits, one being an area of safety and the other being an area of congregation which enables very rapid flushing of the excess minnows after the count is completed.

One unfamiliar with the art might be tempted to draw too close an analogy between automatically counting other objects and counting minnows. But consider:

1. Articles such as pill capsules are easy to count because they are the same weight, size, shape, easily oriented and, most important, inanimate.

2. A minnow is never the same weight, size and shape as its fellows, so other expertise must be relied upon in order to properly orient, convey, count and dispense this creature without damage to it.

The principles of the invention will be further discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

The drawing is a longitudinal sectional view through a device provided in accordance with the principles of the invention.

DETAILED DESCRIPTION OF THE PRESENTLY PREFERRED EMBODIMENT

The electronic minnow counting machine 10 includes as major parts a housing 12, a separation tank 14, a reservoir tank 16 with a pump 18 and make-up means 20, a holding tank 22, a sensing and counting mechanism 24, a valve 26 operated by the counting mechanism 24, and associated tubing 28 interconnecting the tanks in a circuit.

The separation tank 14 is an upwardly open tank positioned relatively high in the housing 12. Its bottom 30 is provided with two laterally spaced, dark colored, downward funneling areas 32 which lead to respective tubing branches 34, 36 which wye together into a common trunk 38. The tube 38 esses upwards, then downwards, terminating in position to debouche its contents into the holding tank 22, located near the bottom of the housing 12.

The sensing and counting station 24 is located at the transition point of the essing trunk 38.

In the instance shown, the valve 26 is a normally open solenoid-operated valve interposed in the tube 38 just downstream from the sensing and counting station 24.

The sensing and counting are preferably effected by the following means. The tube 38 is surrounded by an axially short collar which directs three photo-electric cells 40 and three light sources 42 radially towards the tubing. The cells 40 and sources 42 are arranged in three respective pairs; the pairs are arranged in three lines at 120° to one another, so that every 60° about the collar, there is either a cell or a source Typically, the light sources 42 are of the incandescent, five-volt type and are wired in parallel. Also typically, the photo-cells 40 are of the CdS type and are wired in series. In this preferred embodiment, the photo-cells 40 are charged positive twelve-eighteen volts DC via the light beams, causing an electron flow in the circuit.

As each minnow travels through the sensing and counting area, in which the tubing 38 is translucent, if not transparent, its shadow causes a temporary negative voltage drop across the faces of the cells 40. This pulse is amplified by DC amplifier 44 and converted, e.g., to eighteen volts DC positive at and supplied to the counter 46. (The counter 46, a commercially-available device is one which can be preset to the number of pulses it is to count, i.e., equating to the number of minnows wanted. As each count is made, the counter registers one number closer to zero until zero is reached. Many people will be familiar with this type of counter from their use of xerographic document reproduction machines, which automatically count down the number of copies to be made, then turn of the copy-making apparatus upon reaching zero.)

When the counter reaches zero, it closes the normally open solenoid-operated valve 26.

By preference, a wire basket 48 is provided in the holding tank 22 and a water return line 50 is provided between the holding tank 22 and the reservoir tank 16. The counted fish are removed from the holding tank by raising the wire basket 48 and are placed in the customer's container.

Then, if no more minnows are to be counted, the wire basket may be replaced and a manually-operated button 52 actuated to open the valve 26 and permit the minnows remaining in the separator tank to flow down to the holding tank. The wire basket can then be raised to withdraw these minnows and return them to a bulk tank. (This need not be done if another sale is expected soon.)

Water recirculated to the reservoir tank from the holding tank via the line 50 is recirculated to the separator tank via a sump pump 18 connected to the separator tank via a lateral outlet 54 which aids in circulating the minnows toward the funnel areas during the dispensing operation.

Of course, the level of water in the system can be monitored by eye and replenished to a fill level (not shown) when a certain amount has been lost, i.e., by evaporation, and on the dispensed minnows. However, in the instance shown, the reservoir tank is connected via a tube 56 to a source of make-up water. A float valve 58 is automatically opened to the source, temporarily, to provide make-up water when the float senses that a predetermined threshold level has been reached.

Due to its importance to the preferred embodiment of the invention, the natural habitat effect of minnows and the way the preferred embodiment makes use of it are reiterated. Dark areas represent safety to minnows, a place to go hide. Light areas represent danger to minnows, a place to be afraid of and flee from. In the separator tank 14, by preference, the sidewalls 60 and bottom are all light-colored, except for the funnel areas 32 which are dark-colored, preferably black. Once in the tank 14, natural instinct will aid in their deception: they will swim from the light area where they are safe, though instinct tells them they are in danger, toward the dark funnel areas where they become in danger of accompanying someone's fishing trip as bait, though instinct tells them they are safe. This instinctive orientation mechanism has the further virtue, that because the minnows are swimming towards the dark funnel areas when they exit down into the tubing branches 34, 36 with the draining water stream, they proceed head first and are thus much less likely to be harmed in their transit through the tubing 34, 36, 38 to the holding tank.

It should now be apparent that the Electronic Minnow Counter as described hereinabove possesses each of the attributes set forth in the specification under the heading "Summary of the Invention" hereinbefore. Because the Electronic Minnow Counter can be modified to some extent without departing from the principles of the invention as they have been outlined and explained in this specification, the present invention should be understood as encompassing all such modifications as are within the spirit and scope of the following claims.

What is claimed is:

1. A device for counting live minnows comprising:
a tank for holding water containing a plurality of live minnows which are to be counted;
a conduit connected to the tank to serve as a drain therefor;
a valve interposed in said conduit and shiftable between an open condition which permits water and live minnows to drain through the conduit from the tank, and a closed condition which impounds the water and live minnows in the tank and conduit upstream of the valve;
a minnow sensing and counting means addressing the conduit, for sensing and counting minnows passing through the conduit in the draining water, as they pass said minnow sensing and counting means;
a control device interconnecting the valve and the minnow sensing and counting means, for closing the valve when a preselected number of minnows has been sensed and counted by the minnow sensing and counting means; and
an improvement, wherein the conduit is connected to the tank by funnel means which presents a dark surface towards the minnows in the tank, and the remainder of the tank presenting a light surface towards the minnows, for using the natural habitat effect of minnows to draw them head first toward the funnel means.

2. The device of claim 1 wherein:
the conduit, where it passes the minnow sensing and counting means is translucent, and the minnow sensing and counting means includes at least one light source aimed towards at least one photo-electric cell across the conduit, and an electric counter connected to the photo-electric cell for registering as a counted minnow each event wherein the light source is obstructed from shining on the photo-electric cell long enough for the event to have been the passage of a minnow.

3. The device of claim 2 wherein:
the valve is a solenoid-operated valve.

4. The device of claim 1 further including:
a second tank positioned below the first-mentioned tank to catch the water and counted minnows draining through said conduit;
a removable foraminous container received in the second tank, positioned to receive the counted minnows draining through said conduit and to permit the draining water to pass therethrough into said second tank; and
a water recirculation loop connecting the second tank outside the removable foraminous container with the first-mentioned tank, said water recirculation loop including pump means for forwarding water therein to the first-mentioned tank.

* * * * *